Dec. 16, 1924.  
J. E. HALE  
RESILIENT WHEEL  
Filed Jan. 30, 1922

Inventor  
James E. Hale  
Attorney

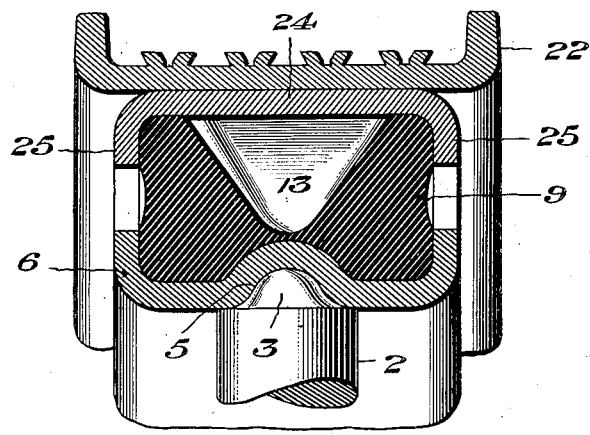
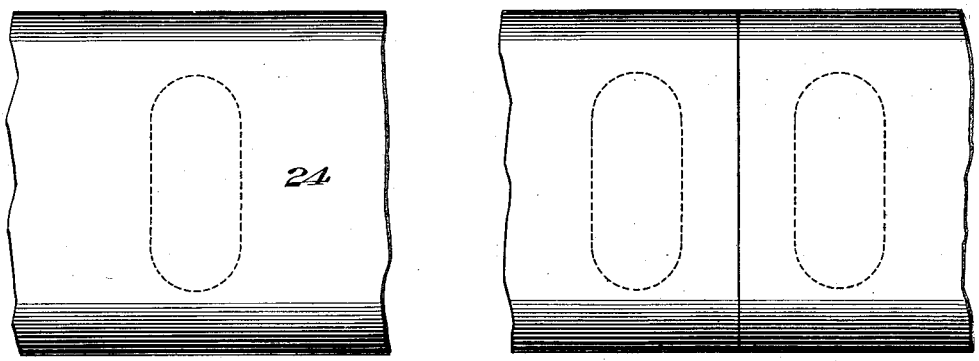
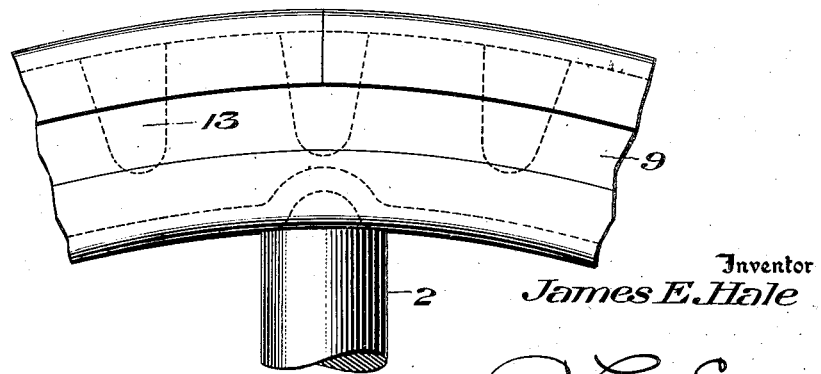

Patented Dec. 16, 1924.

1,519,971

UNITED STATES PATENT OFFICE.

JAMES E. HALE, OF AKRON, OHIO, ASSIGNOR TO THE FIRESTONE TIRE AND RUBBER COMPANY, OF AKRON, OHIO, A CORPORATION OF OHIO.

RESILIENT WHEEL.

Application filed January 30, 1922. Serial No. 532,533.

*To all whom it may concern:*

Be it known that I, JAMES E. HALE, a citizen of the United States, residing at Akron, in the county of Summit and State of Ohio, have invented certain new and useful Improvements in Resilient Wheels, of which the following is a specification.

My invention relates to improvements in resilient wheels of the specific type that embodies, as an essential feature, a cushioning element for supporting a tire carrying rim.

Briefly stated, the invention is directed toward providing a type of retaining means adapted for use in mounting a standard form of tire rim upon a wheel and increasing the stability of the resilient wheel without the sacrifice of any of the cushioning properties of the wheel.

Other objects and advantages such as refinements in the construction of the cushioning member, and the wheel rim proper, are also comprehended in my invention, all of which will hereinafter be described in detail and particularly pointed out in the claims appended hereto.

In the drawings accompanying and forming a part of this specification and in which various forms of the invention have been illustrated:

Fig. 5 is a transverse sectional view on a further enlarged scale showing a modification of the invention.

Fig. 6 is a plan view of a portion of the wheel shown in Fig. 6 with the tire and its rim removed therefrom.

Fig. 7 is a fragmentary top plan view of a further modification of the invention, and Fig. 8 is a fragmentary side elevational view further illustrating the embodiment shown in Fig. 7.

Figure 1:
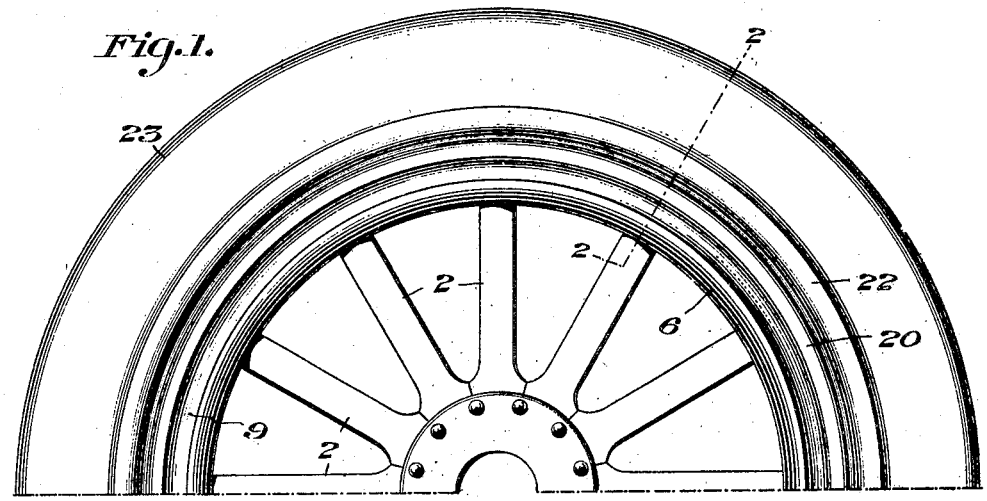
Fig. 1 is a side elevational view of one-half of a wheel illustrating the invention in its preferred form.
Figure 2:
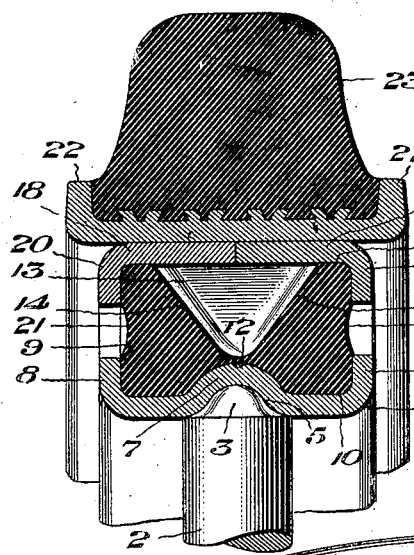
Fig. 2 is a transverse sectional view taken on an enlarged scale, on the line 2—2 of Fig. 1.
Figure 3:
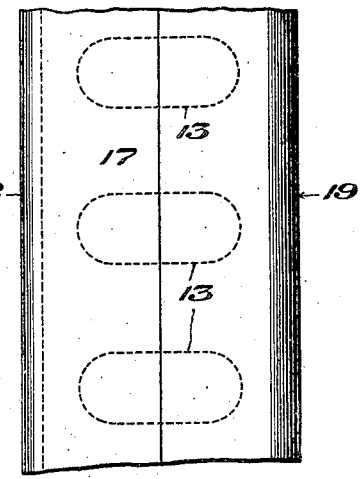
Fig. 3 is a fragmentary top plan view of of the rim retaining element.
Figure 4:
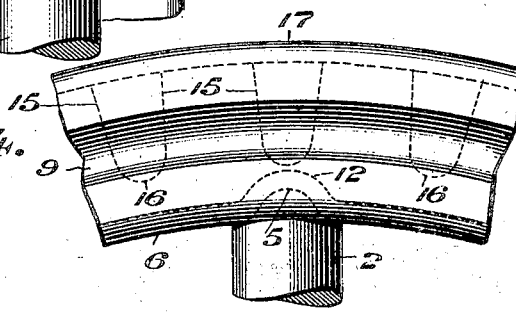
Fig. 4 is a fragmentary side elevational view of a portion of the wheel from which the tire and its rim have been removed.

The wheel proper is designated by the numeral 1, each spoke of which 2 is provided with a knob 3 adapted to be seated in one of a plurality of sockets 5 provided in the face of a fixed rim or felloe. These sockets 5 are formed in the face of the felloe 6 by punching the metal thereof in an outward direction to form in conjunction with each socket a protuberance 7. The felloe 6 is otherwise substantially cylindrical and provided with vertical outwardly turned edge flanges 8, as shown in Figs. 2 and 5 of the drawings.

The cushioning element is designated 9 and comprises an annulus, preferably formed of rubber, or rubber composition adapted to be seated upon the horizontal face of the felloe 6 between the vertical flanges thereof. It is provided with substantially horizontal in transverse section inner and outer peripheral faces designated 10 and 11, respectively, and is designed to support, upon its outer face, my specific type of rim retaining means presently described in detail. In the inner periphery 10 of the annulus, depressions or recesses 12 are formed of the approximate cross-sectional contour best shown in Figs. 2 and 5 of the drawings. These recesses are disposed at spaced intervals around the annulus, or cushioning member, in such position therein as to receive the sockets or protuberances 5 of the felloe 6 and preferably they are of the same cross sectional contour. As will be apparent, one of the functions of the recesses 12 is to prevent the annulus from creeping about the felloe 2.

In its outer peripheral face 11 the annulus is provided with relatively spaced cavities 13, of a peculiar character, and for a purpose presently described. Each cavity is elongated at its mouth in the direction of the width of the annulus 9. The end walls 14, together with the side walls 15, converge toward the center of the wheel into a rounded bottom 16 and form in effect a pyramidal or cone shaped cavity having its apex disposed adjacent the inner periphery of the annulus. Preferably the end walls 14 of the cavity are rounded in horizontal section, whereas the side walls 15 are formed respectively in a plane. A cavity of this formation will be found highly desirable in increasing the cushioning effects of the rubber and in preventing overheating of the rubber during operation. Its peculiar formation prevents the resilient band from collapsing under the weight of the load and the severe side thrust and consequent strains to which the annulus is subjected when a wheel of this character is used in heavy duty hauling and under unfavorable road conditions. Moreover, under severe compression strains, in a direction radial with respect to the wheel, the walls of the cavity, by virtue of their arrangement, produce substantially a suction effect, the advantage of which will be apparent without further description.

The rim retaining means 17 is preferably constructed in the manner shown in Figs. 1 to 4 of the drawings. Briefly described, it comprises co-operating annuli constructed respectively of right angled form in cross-section and relatively disposed to provide an outer transversely flat felloe band which is divided at its median plane into two sections 18 and 19, the opposed edges of the sections being preferably arranged in contacting relation. The outer edge of each section is provided with an inwardly turned flange 20 which co-operates with the outwardly turned flanges 8 of the felloe 6 in partially enclosing the annulus 9. If desired, the annulus or cushioning element may be provided with annular grooves 21 on its side faces between the flanges 20 and 8 to prevent pinching of the annulus 9 when it is under compression. The retaining means 17 is designed to support a tire rim that is provided with a transversely flat inner peripheral face. Such a rim is illustrated at 22 in Fig. 2 of the drawings with a tire 23 mounted thereon. Preferably, it is pressed upon the retaining means 17 after the sections thereof are assembled upon the annulus 9, although this procedure may be varied as desired.

By means of this construction and upon removal of one of the sections 18 or 19, the remaining section, together with the tire and its rim, may be readily removed from the annulus in a lateral direction.

In Figs. 5 and 6 a modification of the rim retaining means has been illustrated. The felloe band designated 24 is, in this instance, a single annulus provided with vertical edge flanges 25 which are inwardly turned as in the preceding form of the invention. A retaining means of this character may be forced upon the annulus or cushioning element 9 by compressing the latter as will be readily understood.

Again, in certain instances, the retaining means shown in Figs. 5 and 6, may be split transversely, as shown in Figs. 7 and 8, to facilitate its assembly with the annulus 9 and its removal therefrom. In the latter instance, however, the tire rim must necessarily be removed from it tire retaining means prior to the latter's removal from the annulus 9.

Although I have described my invention in detail and necessarily utilized certain specific language, it is to be understood that the present disclosure is merely illustrative and is not to be construed as in any way limiting the spirit or scope of the invention unless such limitations are indicated in the claims appended hereto.

Claims:

1. A resilient wheel, comprising a felloe, a resilient band surrounding the felloe, said band being provided with spaced substantially cone shaped recesses in its outer periphery, co-operating male and female elements upon the felloe and band, respectively, for preventing relative movement therebetween, a transversely flat tire supporting rim surrounding the resilient band, and a removable transversely flat annulus between the resilient band and the rim adapted to span the outer periphery of said band.

2. A resilient wheel, comprising a felloe, a resilient band surrounding the felloe, said band being provided with spaced substantially cone shaped recesses in its outer periphery, cooperating male and female elements upon the felloe and band, respectively, for preventing relative movement therebetween, a transversely flat tire supporting rim surrounding the resilient band, and a removable transversely flat annulus, comprising two cooperating annular sections having inwardly turned substantially vertically flanges respectively on their outer edges between the resilient band and the rim, adapted to span the outer periphery of said band.

3. A resilient wheel, comprising a felloe, a resilient band surrounding the felloe, said band being provided with spaced substantially cone shaped recesses in its outer periphery, integrally formed male elements on the felloe and cooperating female elements on the band for preventing relative movement therebetween, a transversely flat tire supporting rim surrounding the resilient band, and a removable transversely flat annulus between the resilient band and the rim adapted to span the outer periphery of said band.

JAMES E. HALE.